(12) United States Patent
Diamant et al.

(10) Patent No.: US 8,833,840 B2
(45) Date of Patent: Sep. 16, 2014

(54) VEHICLE PANEL PROVIDED WITH A MOVABLE WINDOW, AND AN ASSOCIATED VEHICLE

(75) Inventors: Xavier Diamant, Eguilles (FR); Jean-Luc Remy, Rousset (FR); Eric Lambert, Marseilles (FR); Cédric Cristiano, Cabries (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/411,933

(22) Filed: Mar. 5, 2012

(65) Prior Publication Data
US 2012/0227325 A1   Sep. 13, 2012

(30) Foreign Application Priority Data

Mar. 11, 2011   (FR) ...................... 11 00734

(51) Int. Cl.
  *B60J 5/06*   (2006.01)
  *B64C 1/14*   (2006.01)
  *B60J 1/16*   (2006.01)
(52) U.S. Cl.
  CPC .......................................... *B60J 1/16* (2013.01)
  USPC ........................................ 296/190.11; 49/149
(58) Field of Classification Search
  USPC .......................... 296/190.11, 201, 155, 146.4;
        244/129.3; 49/141, 57, 463, 466, 394
  See application file for complete search history.

(56) References Cited

U.S. PATENT DOCUMENTS

| | | | |
|---|---|---|---|
| 2,412,787 A * | 12/1946 | Verhagen | 244/121 |
| 3,010,549 A | 11/1961 | Ferreira | |
| 4,033,528 A * | 7/1977 | Diggs | 244/139 |
| 4,283,885 A * | 8/1981 | Remick et al. | 49/466 |
| 4,932,715 A * | 6/1990 | Kramer | 296/155 |
| 5,168,666 A * | 12/1992 | Koura et al. | 49/360 |
| 5,826,824 A * | 10/1998 | Martin et al. | 244/129.3 |
| 6,027,073 A * | 2/2000 | Gratien Ferrier | 244/129.3 |
| 6,341,748 B1 | 1/2002 | Brooks | |
| 6,386,617 B1 * | 5/2002 | Kusuma et al. | 296/146.15 |
| 6,427,383 B1 * | 8/2002 | Brooks et al. | 49/141 |
| 7,360,823 B2 * | 4/2008 | Nakayama et al. | 296/190.11 |
| 7,438,349 B2 * | 10/2008 | Jo et al. | 296/190.11 |
| 7,765,738 B2 * | 8/2010 | Dufour et al. | 49/213 |

FOREIGN PATENT DOCUMENTS

| | | |
|---|---|---|
| EP | 1424278 A1 | 6/2004 |
| EP | 1433633 A1 | 6/2004 |
| FR | 2885381 A1 | 11/2006 |
| WO | 2010146185 A2 | 12/2010 |

OTHER PUBLICATIONS

Search Report and Written Opinion; Application No. FR 1100734 dated Oct. 24, 2011.

* cited by examiner

*Primary Examiner* — Glenn Dayoan
*Assistant Examiner* — Sunsurraye Westbrook
(74) *Attorney, Agent, or Firm* — Brooks Kushman P.C.

(57) ABSTRACT

A vehicle panel (2) having a body (3) that extends longitudinally and in elevation, said body (3) having a movable window (10) and guide means (15) for guiding movement of said window (10) relative to the body (3), said window (10) having a frame (11) within which there is a transparent surface (12). The window (10) includes release means (30) for manually releasing the window (10) from the body (3) in order to provide an emergency exit, the release means (30) co-operating with the guide means (15).

17 Claims, 4 Drawing Sheets

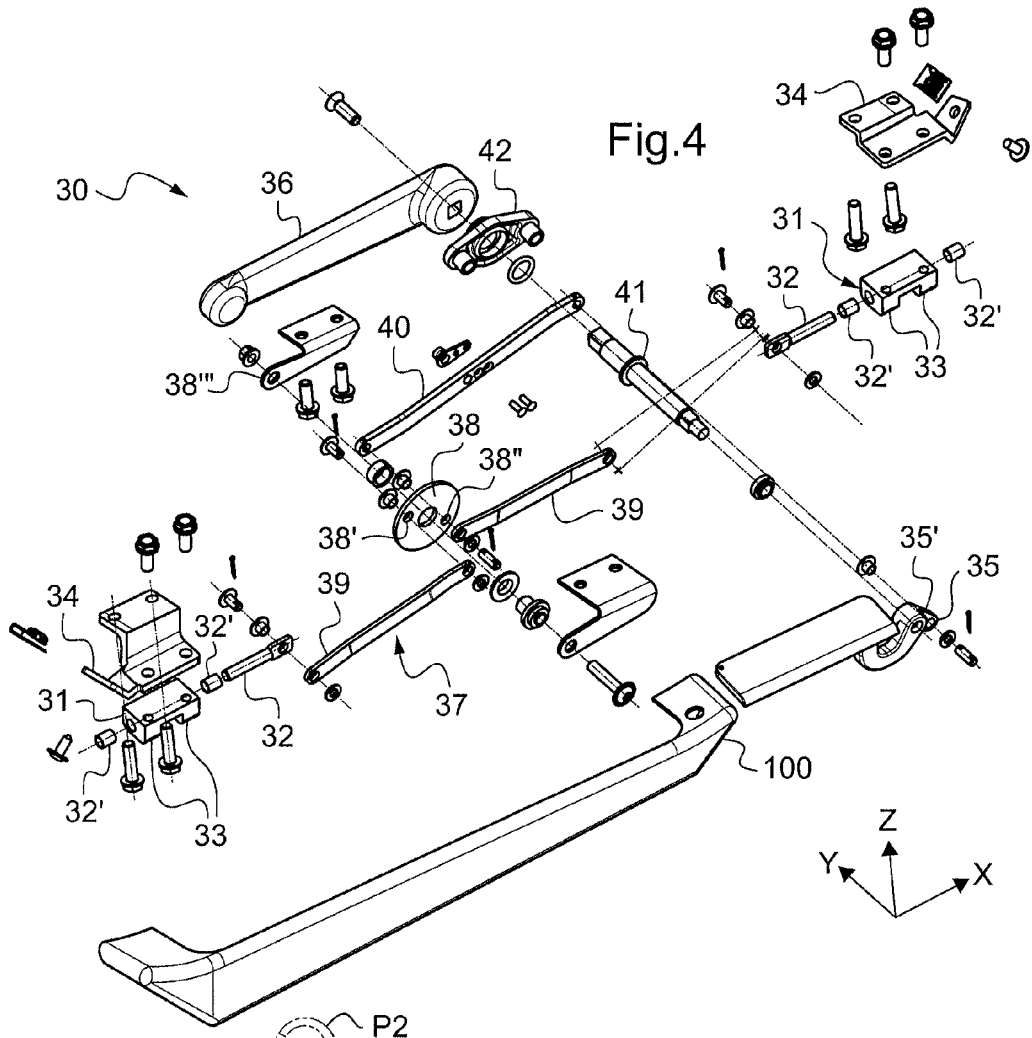
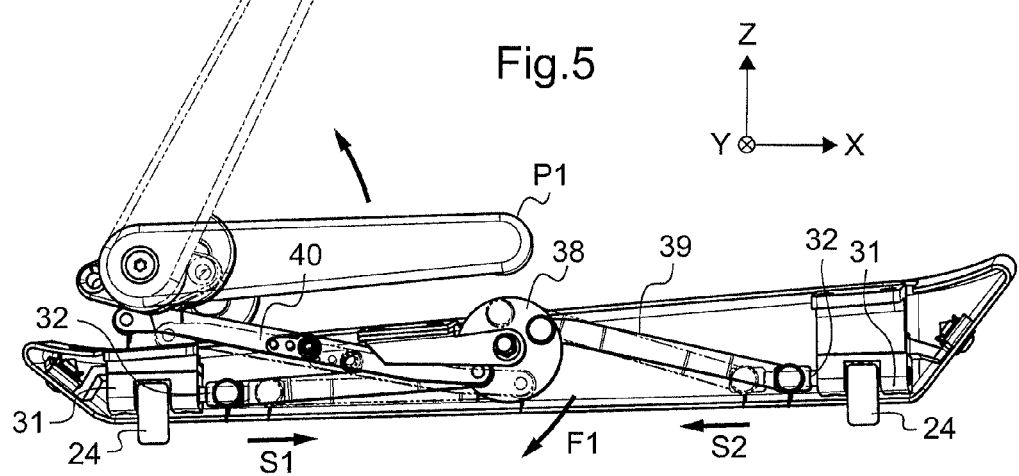

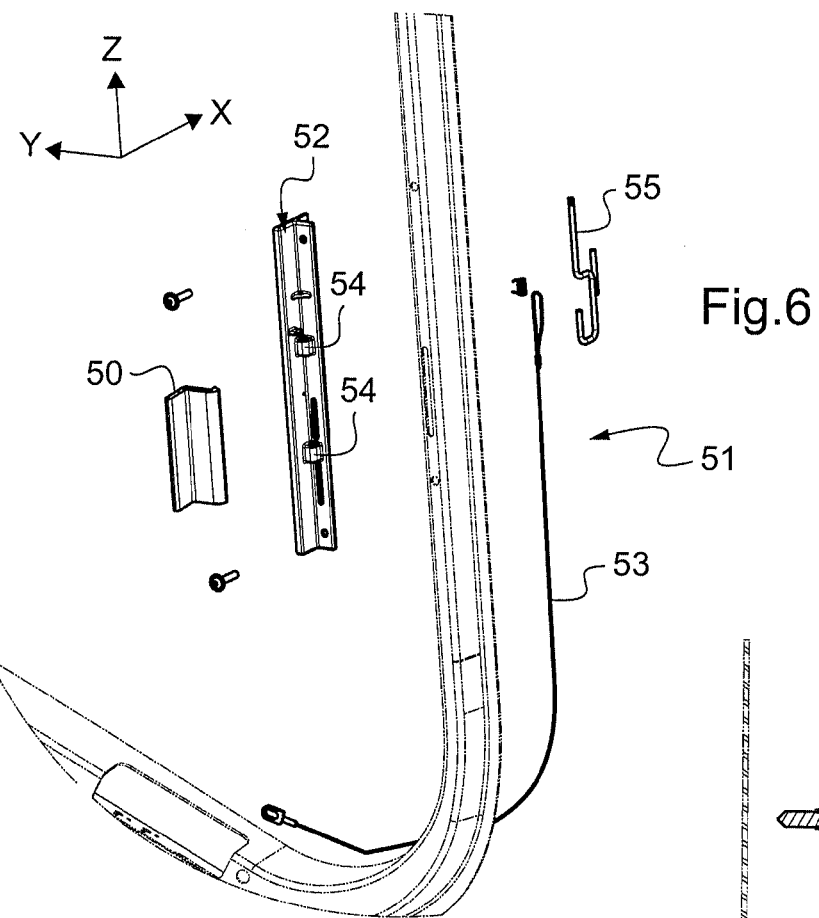
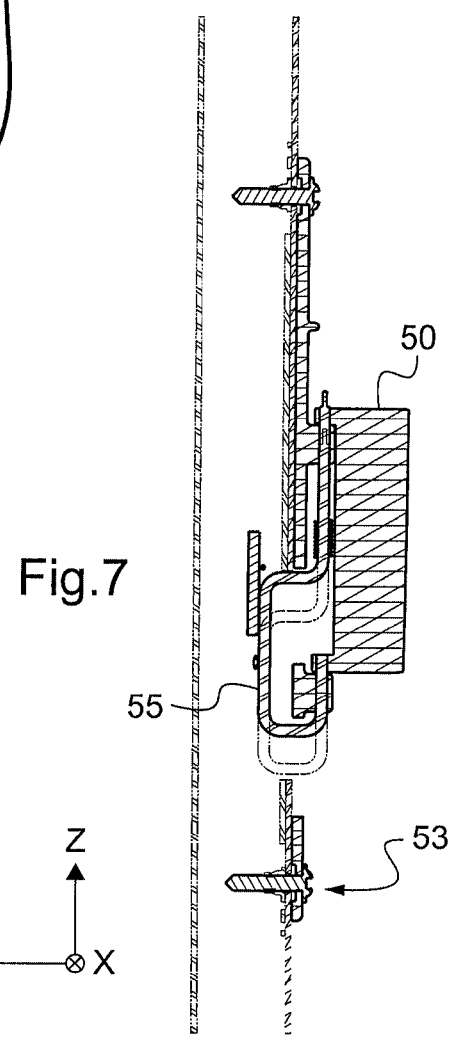

VEHICLE PANEL PROVIDED WITH A MOVABLE WINDOW, AND AN ASSOCIATED VEHICLE

CROSS REFERENCE TO RELATED APPLICATION

This application claims priority to FR 11 00734 filed on Mar. 11, 2011, the disclosure of which is incorporated in its entirety by reference herein.

BACKGROUND OF THE INVENTION (1) Field of the Invention

The present invention relates to a vehicle panel provided with a sliding window and to the associated vehicle, more particularly a rotorcraft type aircraft.

(2) Description of Related Art

In order to provide an emergency exit so as to enable an occupant of a vehicle to escape, it is common practice to provide the shell of the vehicle with a removable panel. It should be observed that the term "shell" is used of a vehicle to designate the outside structure of the vehicle, e.g. referred to as a "fuselage" if the vehicle is an aircraft.

For example, the panel may be a jettisonable door of the aircraft. By removing the door by means of a jettisoning mechanism, an emergency exit is released that can be used by an occupant of the vehicle.

It should be observed that the mechanism for jettisoning the panel needs to be made safe so as to avoid any unwanted jettisoning while the vehicle is in use.

In addition, in the event of the vehicle suffering an accident, the shell of the vehicle may suffer large amounts of deformation, and some kinds of deformation may degrade the operation of the mechanism for jettisoning the panel.

The state of the art includes several documents.

For example, document U.S. Pat. No. 6,341,748 describes a panel provided with a porthole, the panel being suitable for reversibly closing an opening so as to provide an emergency exit if needed.

It should be observed that the term "porthole" is used herein to mean a fixed transparent element, while the term "window" is used to mean a transparent element that is movable relative to the body that supports it.

The panel is fastened to the periphery of the opening by means of a plurality of catches, which catches may be retracted by a release mechanism having movable means that slide in a slideway. By operating the mechanism, the movable means are caused to move, thereby retracting the catches. It is then possible to remove the panel in order to obtain the required emergency exit.

Document U.S. Pat. No. 5,826,824 also describes a panel provided with a porthole, the panel being suitable for reversibly closing an opening that acts as an emergency exit.

The panel is connected to the periphery of the opening via a seal, with a plurality of retention means blocking the panel in a lateral direction. Under such circumstances, a control handle is arranged to exert a force that enables the seal to be released from the periphery of the opening so as to allow the panel to be detached.

It should also be observed that vehicles are sometimes provided with windows that can be opened. More particularly, an aircraft may include at least one window that the crew can open during poor weather conditions in order to avoid misting, with such windows being referred to as "bad weather" windows.

A sliding bad weather window may then be arranged on a panel that can be jettisoned in order to provide an emergency exit, a jettisonable door, or a jettisonable porthole, for example.

It can be understood that such bad weather windows are generally of small size and liable to impede crew visibility.

It should be observed that documents EP 1 433 633 and EP 1 424 278 describe sliding windows.

Document U.S. Pat. No. 3,010,549 suggests opening a window to provide an emergency exit.

The following documents are also known: WO 2010/146185 and FR 2 885 381.

BRIEF SUMMARY OF THE INVENTION

An object of the present invention is thus to propose a vehicle panel having a movable window enabling an emergency exit to be provided, with the risk of the emergency exit blocking independently of the nature of the accident being at least reduced and possibly small or even zero depending on the variant.

According to the invention, a vehicle panel has a body that extends longitudinally and in elevation, said body having a movable window and guide means for guiding movement of said window relative to the body, said window having a frame within which there is a transparent surface.

The panel is remarkable in particular in that the window includes release means for manually releasing the window from the body in order to provide an emergency exit, the release means co-operating with the guide means.

Under such circumstances, in the event of the vehicle suffering an accident, the window is removed from the panel using the release means, unlike prior techniques that seek to jettison the entire panel.

The window used may for example act as a conventional non-jettisonable bad weather window. Consequently, in the invention, the window performs firstly the role of a conventional window and of a bad weather window, and secondly makes it possible to open an emergency exit after an accident.

In particular, the release means enable the window to be removed after an accident that deforms the panel in a manner that would prevent moving the window merely by sliding it.

The panel may also comprise one or more of the following characteristics.

For example, the transparent surface of the window may be in register with an opening in the body when the window is in a closed position, the opening having given dimensions for enabling an individual to pass therethrough.

Consequently, the transparent surface is of large dimensions, unlike a bad weather window of the type usually used.

Thus, if the window deforms considerably as a result of an accident, it can be understood that the transparent surface will not withstand the forces to which it is subjected and that it may, in fact, explode.

Under such circumstances, in the penalizing and improbable situation of the release means malfunctioning after a violent accident, an individual can in the extreme escape through the transparent surface in order to leave the vehicle. It is that much easier to pass through the window when the transparent surface is destroyed as a result of the accident.

Furthermore, for a window that slides longitudinally relative to the body in order to pass from a closed position to a position that is at least partially open, and vice versa, the guide means comprise at least one first rail and at least one second rail that are fastened to the body and arranged at opposite ends of the window in elevation, the first rail co-operating at least with connection means for connecting the window, the second rail co-operating with the release means.

For example, each first rail may be situated above the window with the window being situated above each second rail.

According to an aspect of the invention, each first rail includes first runner means slidable in a first slideway, and the connection means comprise a connection peg of the frame of the window, the connection peg being suitable for being pressed into an orifice in elevation in the runner means.

Thus, moving the window towards the connection peg as allowed by the release means enables these connection pegs to be released from the guide means.

For example, each second rail may include at least one stud provided with a shoe slidable in a second slideway of the second rail, the release means being provided with one retention means per stud co-operating by shape interference with the stud, and with one movable locking finger per stud to secure each retention means reversibly to a stud.

Consequently, when the locking fingers are engaged in the studs and the associated retention means, it is not possible to remove the window from the panel.

Conversely, when the locking fingers are not engaged in the studs and the associated retention means, tilting the window enables the window to be released from each second rail.

In a variant, the retention means possess a U-shape having two side branches, the stud being arranged between the side branches in a longitudinal direction, the locking finger passing through the stud and the branches when the release means secure the window to the body.

Furthermore, said release means include at least one jettisoning handle secured to the window and connected by a linkage to each locking finger, in order to cause the fingers to move from a locked position to an unlocked position, and vice versa.

Preferably, said release means include two jettisoning handles arranged transversely on opposite sides of the transparent surface of the window. Thus, the release means may be operated from both outside and inside the vehicle.

In a preferred embodiment, the panel may then comprise:

two first rails of the guide means fastened to the body and co-operating with two connection pegs connecting with the frame of the window;

two second rails of the guide means fastened to the body, each second rail having a stud provided with a shoe sliding in a second slideway of the second rail, the release means being provided with two retention means and two movable locking fingers, each retention means co-operating by shape interference with a stud and with a locking finger, each locking finger securing each retention means in reversible manner to a stud; and at least one jettisoning handle connected by a linkage to an intermediate rotary member, the locking fingers being hinged respectively to two diametrically opposite points of the rotary member, turning the jettisoning handle causing the two locking fingers to move in translation in opposite directions.

In another aspect, the panel may include a slide handle for moving the window from a closed position to a position that is at least partially open relative to the body, the slide handle co-operating with a hook of said body in order to close said window.

Optionally, a handle for jettisoning the window is connected to the slide handle by a mechanical link for causing the slide handle to be released from the hook.

For example, said mechanical link includes a cable connected to a pin, the pin connecting the slide handle to the window in a locked, first position, and releasing the slide handle from the window in an unlocked, second position.

In addition to a panel, the invention also provides a vehicle fitted with such a panel. The vehicle may be a vehicle for traveling on land, on water, or in the air, and more particularly it may be an aircraft.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 4 is an exploded view of release means;

FIG. 5 is a diagrammatic section explaining the operation of the release means; and FIGS. 6 and 7 are diagrams showing slide means of the invention.

Elements that are present in more than one of the figures are given the same references in each of them.

DETAILED DESCRIPTION OF THE INVENTION

Three mutually orthogonal directions X, Y, and Z are referenced in FIGS. 1 to 4.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "elevation" relates to any direction parallel to the third direction Z.

Figure 1:
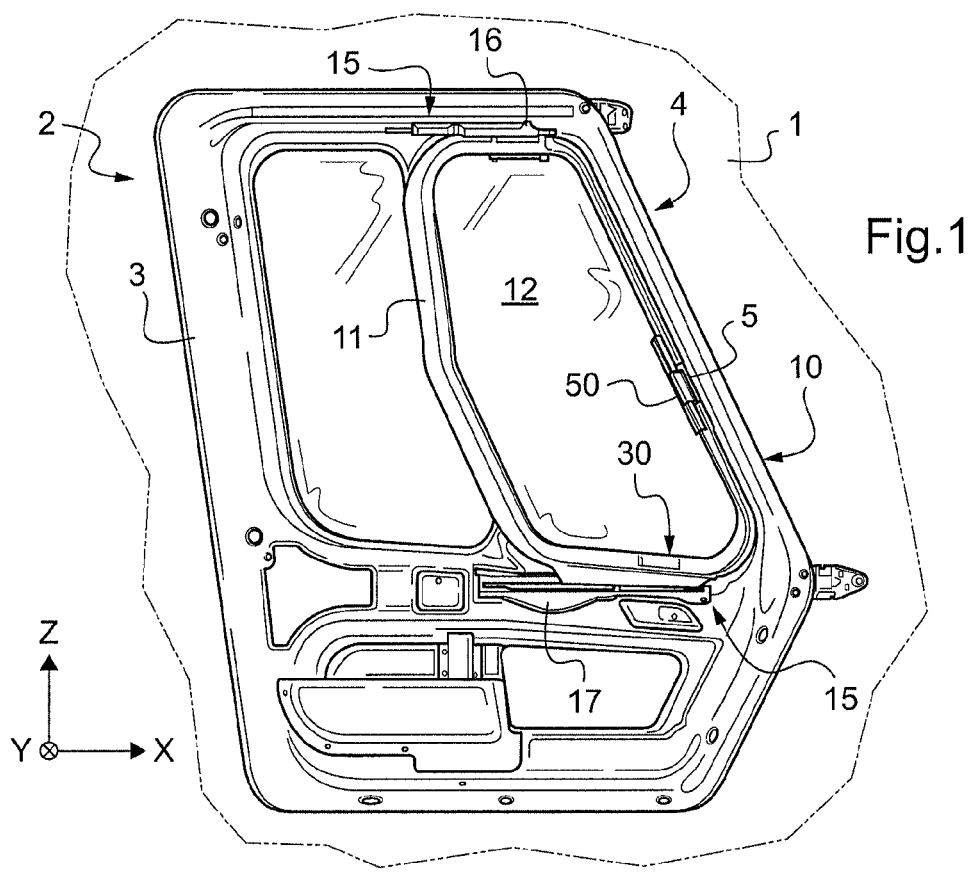
FIG. 1 is a view of a vehicle provided with a panel of the invention that includes a window shown in the closed position.
Figure 2:
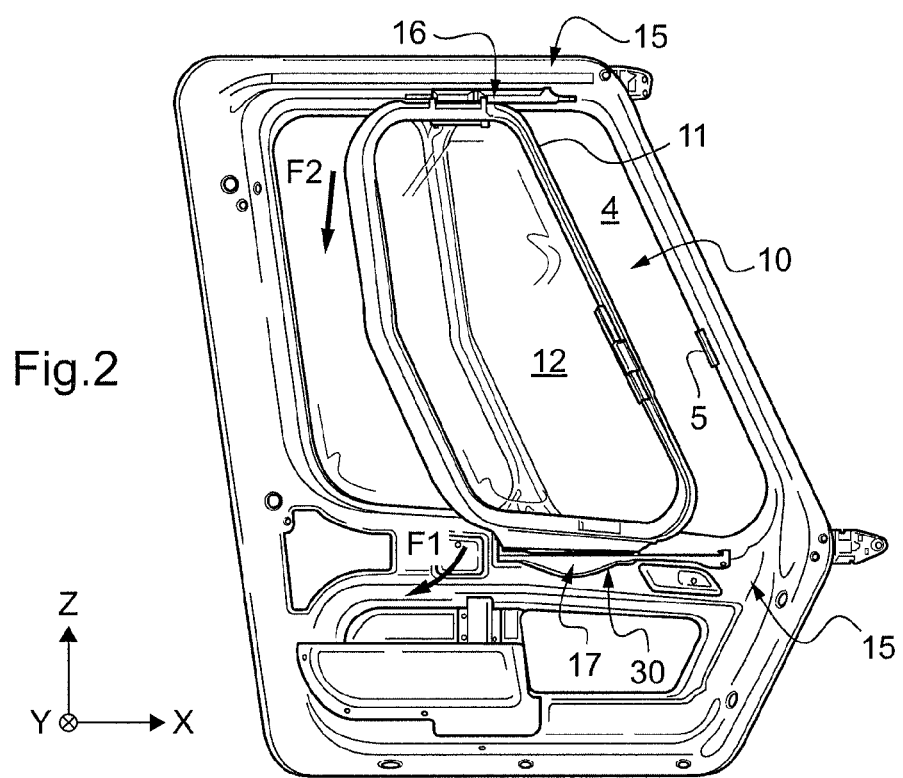
FIG. 2 is a view of a vehicle fitted with a panel of the invention that includes a window shown in the open position.

FIGS. 1 and 2 show a vehicle 1 shown diagrammatically in order to avoid overcrowding said FIGS. 1 and 2. By way of example, the vehicle 1 may be of the aircraft type.

The vehicle 1 possesses an outer shell defining its shape, its outer shell including a panel 2, e.g. a door.

The panel 2 is provided with a body 3 extending longitudinally and in elevation, the thickness of the body 3 being directed in a transverse direction. The body possesses an opening 4 of large dimensions, with the dimensions given to the opening 4 being determined so as to allow an individual to pass therethrough in the event of an accident. The opening 4 thus acts as an emergency exit.

Furthermore, the panel 2 is provided with a window closing the opening 4 in a closed position as shown in FIG. 1. The window 10 thus comprises a frame 11 carrying a transparent surface 12, such as a pane.

The window is fastened to the body 3 of the panel by guide means 15 enabling the window 10 to go from the closed position shown in FIG. 1 to a position that is at least partially open. For example, the guide means comprise a first rail 16 and at least one second rail 17 fastened to the body 2 at opposite ends of the window 10 in an elevation direction in order to enable the window 10 to pass to the open position shown in FIG. 2 by sliding relative to the body 3.

It may be observed in FIG. 1 that the window may include a slide handle 50 secured to the frame 11, the slide handle being capable of co-operating with a hook 5 of the body 3. In order to open the window 10, an individual operates the slide handle 50 which turns about a pivot axis in order to move the slide handle 50 away from the hook 5.

Furthermore, in the closed position, the window is in register with the opening 4 of the body. It can be understood that the transparent surface 12 is of large dimensions, like the opening 4. If the window is damaged as a result of an accident, the transparent surface may be broken to allow an individual to pass through the window and the opening 4.

Furthermore, the window includes manual release means co-operating in particular with the guide means 15 to allow the window to be jettisoned, i.e. to allow the window 10 to be detached from the body 3.

Instead of jettisoning the entire panel, the invention thus seeks to jettison only a window, i.e. a glazed member that is movable, as contrasted to a porthole type window that by definition is fixed.

With reference to FIG. 2, in order to jettison the window, it is possible to operate the release means 30 co-operating with the second rail 17 so as to release the release means 30 from the guide means 15 along arrow F1, and then detach the window 10 by moving it away from the first rail 16 along arrow F2.

Figure 3:
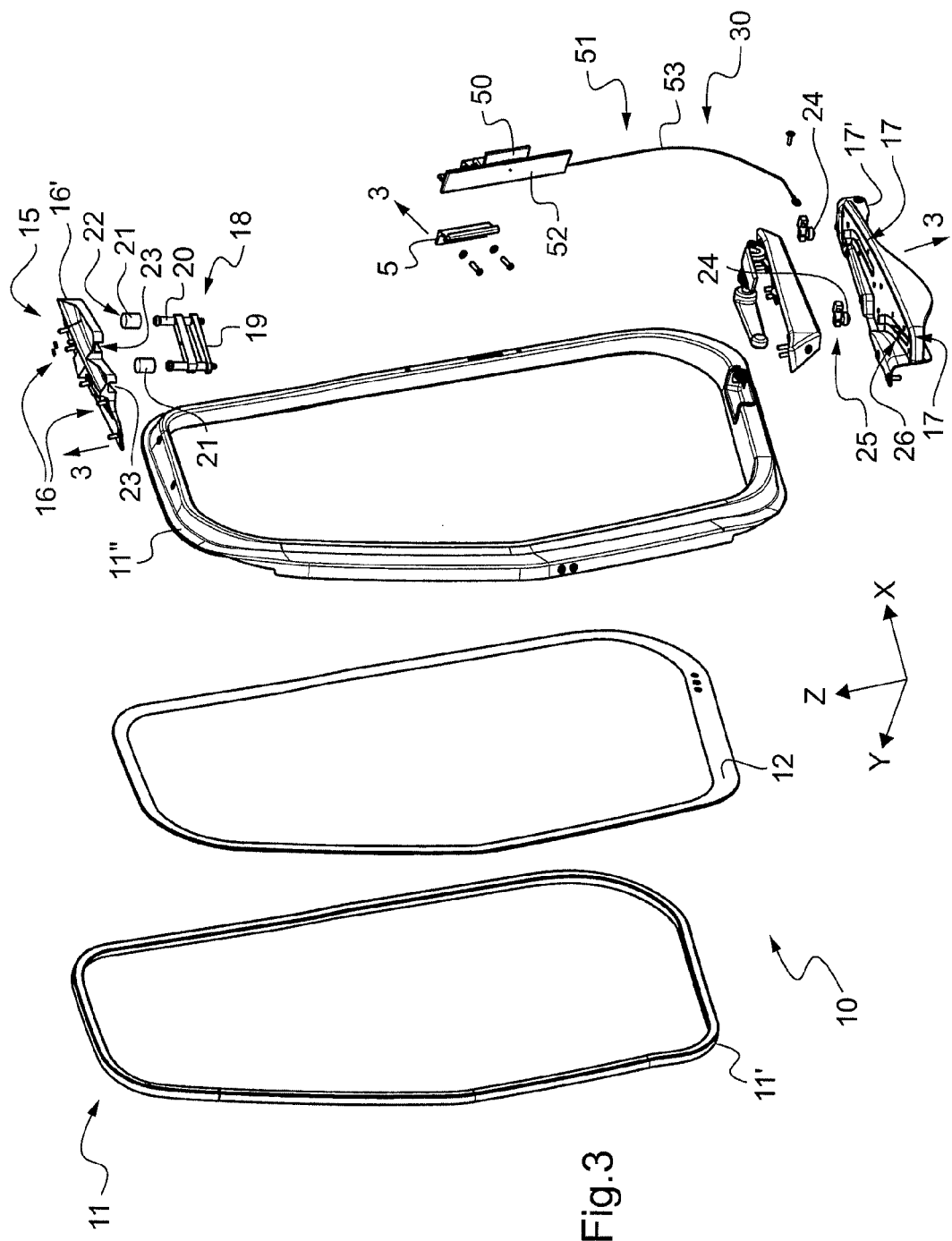
FIG. 3 is an exploded view of a window of the invention.

FIG. 3 is an exploded view of the window 10 of the invention co-operating with guide means 15 of the body 3 of the panel.

The guide means include at least a first rail 16, i.e. a top rail over the window 10. In the preferred embodiment shown diagrammatically, the guide means include two first rails 16 together forming a one-piece first unit 16'.

Each first rail 16 is provided with a slideway 23 formed in the first unit 16', and with first runner means 21 provided with an orifice 22. For example, the first runner means 21 may comprise a wheel that slides in the associated slideway.

Under such circumstances, the window 10 has a frame provided with a seal 11' and a carrier structure 11'' surrounding the transparent surface 12.

The carrier structure 11'' thus carries connection means 18 co-operating with each first rail. The connection means 18 are provided with a connection support 19 fastened to the frame 11 and more particularly to its carrier structure 11'', the connection support 19 having one connection peg 20 for each first runner means 21.

The connection pegs 20 are then inserted in the orifices 22 of the first runner means 21. It should be observed that deformation of the slideway does not prevent the window from being detached, since the window does not co-operate directly with the slideway.

Furthermore, the guide means 15 include at least one second rail 17, i.e. a bottom rail under the window 10. In the preferred embodiment shown diagrammatically, the guide means include two second rails 17 together forming a one-piece second unit 17'.

Each second rail 17 is provided with a slideway 26 formed in the second unit 17', and a stud 24 provided with a shoe 25 sliding in the associated slideway. Thus, the stud projects from the associated slideway, whereas a shoe, e.g. of the wheel type, secured to the stud slides in said slideway.

Under such circumstances, the window 10 includes release means co-operating with each second rail 17.

With reference to FIG. 4, the release means 30 comprise one retention means 31 per stud, each retention means 31 being fastened by a fastener plate 34 to the frame 11 and co-operating by shape interference with a stud. Consequently, each retention means 31 may be U-shaped, having two side branches 33 between which a stud 24 is arranged when the window is connected to the body 2.

It should be observed that a cover 100 may be fastened to the fastener plate 34, for example.

Furthermore, the release means include one locking finger 32 per stud, each locking finger being capable of passing through both a retention means 31 and the associated stud 24. It should be observed that the retention means may be provided with a guide ring 32' inserted in each side branch 33 in order to facilitate passing a locking finger 32.

In order to move the locking finger 32 from a locked position to an unlocked position, and vice versa, the release means may include at least one jettisoning handle, preferably two jettisoning handles 35 and 36 arranged on either side of the transparent surface 12.

The jettisoning handles 35 and 36 are then mechanically connected to each of the fingers via a linkage 37.

For example, the jettisoning handles 35 and 36 are connected together by a shaft 41 that is connected to the frame 3 via a fastener support 42. Furthermore, at least one jettisoning handle 35 is hinged to a control rod 40 by a crank 35', the control rod being hinged to an intermediate rotary member 38. The rotary member 38 is held to the frame 11 by a bracket 38'''.

Each locking finger is then hinged to the rotary member 38 by a link rod 39. With reference to FIG. 4, when the release means 30 have two locking fingers 32, these two locking fingers 32 are hinged to two diametrically opposite points 38' and 38'' of the rotary member 38.

FIG. 5 uses continuous lines to show the release means in a locked position in which it prevents the window being jettisoned, and uses chain-dotted lines to show it in an unlocked position allowing the window to be jettisoned.

In the locked position, the jettisoning handles are in a first position P1. The locking fingers 32 then connect each stud 24 to corresponding retention means.

Conversely, when at least one jettisoning handle is operated by causing it to turn so as to reach a second position P2, the locking members move in translation so that they no longer pass through the studs.

In the variant described above, the two locking fingers move in translation in opposite directions S1 and S2.

Consequently, the retention means 31 are no longer fastened to the studs. An individual imparting movement to the window along arrow F1 then enables the window to be detached from the body 3.

With reference to FIG. 3, the release means may co-operate with a slide handle 50, the slide handle 50 being fastened to the carrier structure 11'' of the frame 11 by a slide support 52. At least one jettisoning handle is then connected to the slide handle 50 via a mechanical link 51 including a cable 53.

FIG. 6 shows a preferred linkage 51.

This mechanical link 51 comprises a cable 53 fastened to a crank 35' of a jettisoning handle 35, for example, and also a pin 55.

The slide handle 50 co-operates with two hinges 54 of the slide support 52 via the pin 55.

For the jettisoning handles in a locked position, the pin 55 is shown in continuous lines in FIG. 7. Under such circumstances, the pin 55 fastens the slide handle 50 to the slide support 52.

Conversely, for an unlocked position of the jettisoning handles, the pin 55 is shown in chain-dotted lines in FIG. 7. Under such circumstances, the pin 55 no longer connects the slide handle 50 to the slide support 52.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A vehicle panel having a body that extends longitudinally and in elevation, said body having a movable window and guide means for guiding movement of said window relative to the body, said window having a frame within which there is a transparent surface, wherein said window includes release means for manually releasing the window from the body in order to provide an emergency exit, the release means co-operating with the guide means;
    wherein said window slides longitudinally relative to said body, and said guide means comprise at least one first rail and at least one second rail that are fastened to the body and arranged at opposite ends of the window in elevation, the first rail co-operating at least with connection means for connecting the window, the second rail co-operating with the release means; and
    wherein each second rail includes at least one stud provided with a shoe slidable in a second slideway of said second rail, said release means being provided with one retention means per stud co-operating by shape interference with said stud, and with one movable locking finger per stud to secure each retention means reversibly to a stud.

2. A vehicle panel according to claim 1, wherein said transparent surface is in register with an opening in said body when the window is in a closed position, said opening having given dimensions for enabling an individual to pass therethrough.

3. A vehicle panel according to claim 1, wherein each first rail includes first runner means slidable in a first slideway, and said connection means comprise a connection peg of said frame, the connection peg being suitable for being pressed into an orifice in elevation in said runner means.

4. A vehicle panel according to claim 1, wherein said retention means possess a U-shape having two side branches, said stud being arranged between said side branches, said locking finger passing through said stud and said side branches when said release means secure the window to the body.

5. A vehicle panel according to claim 1, wherein said release means include at least one jettisoning handle secured to the window and connected by a linkage to each locking finger.

6. A vehicle panel according to claim 5, wherein said release means include two jettisoning handles arranged transversely on opposite sides of the transparent surface of the window.

7. A vehicle panel according to claim 1, comprising:
    two first rails of the guide means fastened to said body and co-operating with two connection pegs connecting with the frame of the window;
    two second rails of the guide means fastened to said body, each second rail having a stud provided with a shoe sliding in a second slideway of said second rail, said release means being provided with two retention means and two movable locking fingers, each retention means co-operating by shape interference with a stud and with a locking finger, each locking finger securing each retention means in reversible manner to a stud; and
    at least one jettisoning handle connected by a linkage to an intermediate rotary member, the locking fingers being hinged respectively to two diametrically opposite points of said rotary member, turning the jettisoning handle causing the two locking fingers to move in translation in opposite directions.

8. A vehicle panel according to claim 1, including a slide handle co-operating with a hook of said body.

9. A vehicle panel according to claim 8, wherein at least one jettisoning handle is connected to said slide handle by a mechanical link for causing the slide handle to be released from said hook.

10. A vehicle panel according to claim 9, wherein said mechanical link includes a cable connected to a pin, the pin connecting the slide handle to the window in a locked, first position, and releasing the slide handle from the window in an unlocked, second position.

11. A vehicle, including a panel according to claim 1.

12. A vehicle panel comprising a body that extends longitudinally and in elevation, the body having a movable window and guide means for guiding movement of the window relative to the body, the window having a frame including a transparent panel therein, wherein the window includes release means configured to co-operate with the guide means to remove the window from the guide means for manually releasing the window from the body in order to provide an emergency exit;
    two first rails of the guide means fastened to said body and co-operating with two connection pegs connecting with the frame of the window;
    two second rails of the guide means fastened to said body, each second rail having a stud provided with a shoe sliding in a second slideway of said second rail, said release means being provided with two retention means and two movable locking fingers, each retention means co-operating by shape interference with a stud and with a locking finger, each locking finger securing each retention means in reversible manner to a stud; and
    at least one jettisoning handle connected by a linkage to an intermediate rotary member, the locking fingers being hinged respectively to two diametrically opposite points of said rotary member, turning the jettisoning handle causing the two locking fingers to move in translation in opposite directions.

13. An aircraft panel including an emergency exit window, the aircraft panel comprising:
    a body that extends longitudinally and in elevation, the body having a movable window, the window comprising a frame and a transparent panel supported within the frame; and
    a guide for guiding movement of the window relative to the body, the guide being configured to allow the window to be removed from the guide for manually releasing the window from the body in order to provide an emergency exit, wherein the guide comprises at least a first rail and a second rail, the second rail having at least one slidable shoe in a slideway of the second rail.

14. The aircraft panel of claim 13, wherein the transparent panel is in register with an opening in the body when the window is in a closed position, the opening being dimensioned to enable an individual to pass through.

15. The aircraft panel of claim 13, wherein the slidable shoe is configured to be in a locked position within the guide during longitudinal sliding movement relative to the body.

16. The aircraft panel of claim 15, further comprising a handle, the handle configured to unlock the slidable shoe from the locked position to an unlocked position within the guide when the window is in a closed position to allow for the window to be removed from the guide.

17. The aircraft panel of claim 16, wherein the slidable shoe comprises at least one stud configured to co-operate with a locking finger to selectively engage and disengage the slidable shoe in the guide.

* * * * *